United States Patent [19]

Hartman et al.

[11] Patent Number: 5,297,460
[45] Date of Patent: Mar. 29, 1994

[54] VIBRATION DAMPENING DEVICE

[75] Inventors: Kenneth E. Hartman, Nashville; James D. Ford, Franklin, both of Tenn.

[73] Assignee: Ammco Tools Technology Corporation, Wilmington, Del.

[21] Appl. No.: 989,379

[22] Filed: Dec. 11, 1992

[51] Int. Cl.$^5$ .............................................. B23B 5/02
[52] U.S. Cl. ........................................ 82/163; 82/112; 82/152; 267/136
[58] Field of Search ................ 82/163, 112, 152, 104, 82/123; 267/136, 137, 255, 275; 188/218 A

[56] References Cited

U.S. PATENT DOCUMENTS

| | | | |
|---|---|---|---|
| 3,691,878 | 9/1972 | Mitchell | 82/112 |
| 3,710,661 | 1/1973 | Mitchell | 82/163 |
| 4,178,819 | 12/1979 | Mahon | 82/163 |
| 4,531,434 | 7/1985 | Vasquez | 82/112 |

Primary Examiner—Paula A. Bradley
Assistant Examiner—Erik R. Puknys
Attorney, Agent, or Firm—Patnaude, Videbeck & Marsh

[57] ABSTRACT

A device for dampening the vibration of a rotating disc during the machining of the faces thereof has a spring member having a wide base portion and two arms extending from the ends of the base. At the face end of each arm is a pad mounted to pivot about an axis perpendicular to the axis of the arm. A dampening device in accordance with this invention has eye shields without requiring that the eye shield be removed.

5 Claims, 2 Drawing Sheets

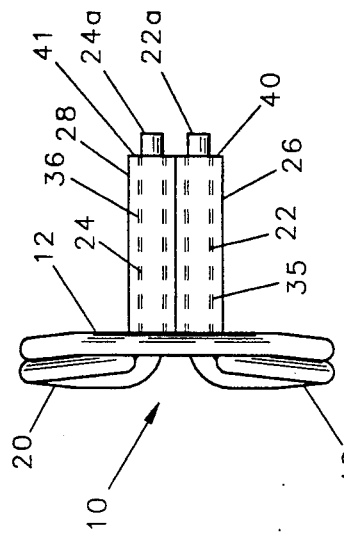
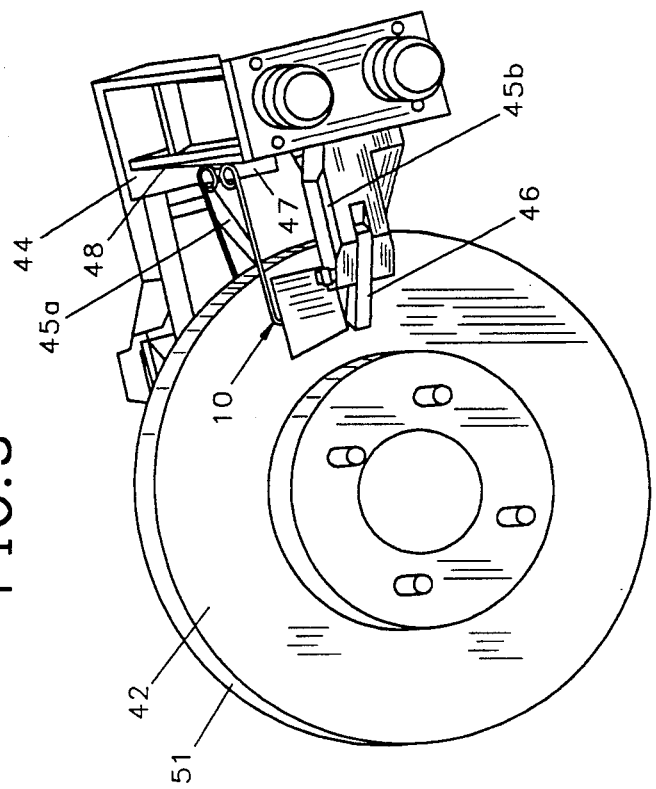
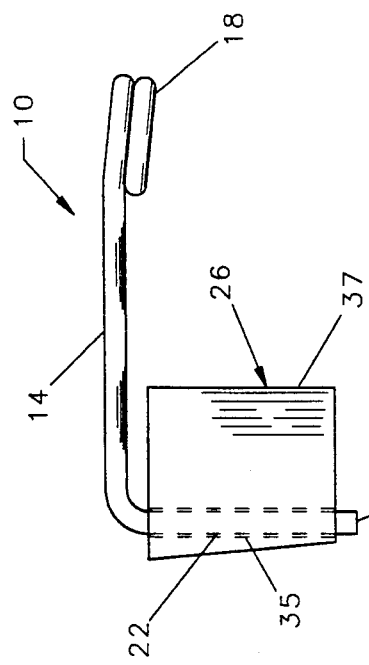
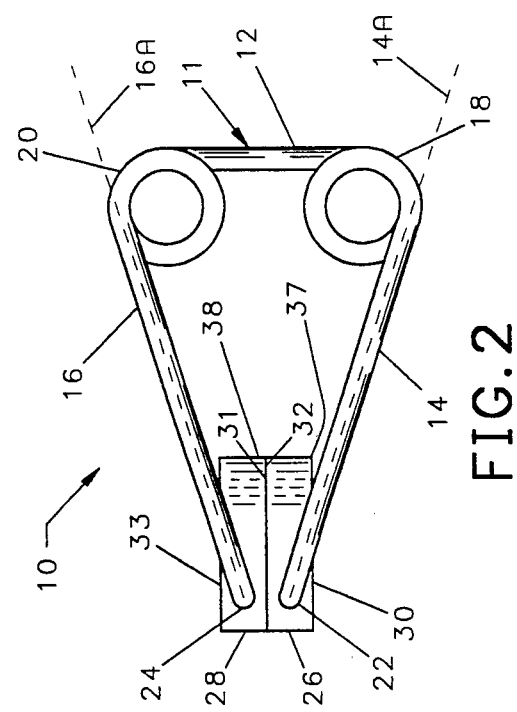

VIBRATION DAMPENING DEVICE

The present invention relates to vibration dampeners, and in particular to a device to reduce vibration in a metal disc being rotated for the purposes of machining the faces of the disc.

BACKGROUND OF THE INVENTION

Disc brakes for automobiles and other vehicles include a metallic disc or rotor on the axle of the vehicle positioned adjacent the wheel mounting, the faces of which are gripped by a friction material to brake the rotation of the wheel. After periods of excessive use, disc brake rotors wear unevenly such that annular ridges are worn into the surface of the metal around the perimeter of the rotor. The ridges detract from the proper operation of the brakes and, therefore, when the wear has become excessive, the faces of the rotor are subjected to a machining operation which removes metal and leaves the faces smooth and parallel to each other. The machining process may be accomplished by removing the rotor from the vehicle and attaching it to a rotatable member. A pair of tools securely mounted adjacent the edge of the rotor are then moved along the two faces of the rotor while it is rotating to shave off sufficient metal to leave the remaining surfaces smooth. As an alternative, mountings are available which hold the tools adjacent the opposite sides of the rotor while the rotor is mounted on the vehicle. A separate motor rotates the rotor such that the rotor can be machined without removing it from the vehicle.

In either of the two processes described above, the rotor and tools have a tendency to vibrate during the machining operation and such vibrations can be extremely noisy, and the vibration may result in unevenness of the surface of the faces of the rotor after machining and thereby reduce the effectiveness of the machining operation. To reduce such vibration, it has become common to attach to the support mechanism holding the tools, a vibration dampening device, typical examples of which are shown by U.S. Pat. Nos. 3,710,661 and 4,531,434.

Prior art dampening devices have generally provided arms which attach to the tool mounting element, such as shown in U.S. Pat. No. 3,710,661 or as an alternative, consist of two long arms which are retained in position by resting them against the tool mounting mechanism as shown in U.S. Pat. No. 4,531,434. In many cases, however, the tool supporting member is not adapted to attach a dampening device such as shown in U.S. Pat. No. 3,710,661. Also, prior art dampening devices having a pair of long arms which rest upon the upper surfaces of the tool mount and therefore are not physically adaptable for use with certain machines intended to resurface rotors mounted on the vehicle and also block the positioning of a protective shield provided certain machines which are intended to prevent shavings from being tossed into the face of an operator. As a result, none of the existing dampening devices can be sold as original equipment for certain machines because the machines cannot be operated safely with the dampener attached and the use of the dampener would violate certain United States safety standards under the existing federal laws.

The present invention is intended to provide a dampening device which can be used with many existing lathes, including those which machine the surfaces of rotors while on the vehicle and those which machine the surfaces of a rotor removed from a vehicle without interfering with the use of the protective shield adaptable for use with such machines.

SUMMARY OF THE INVENTION

Briefly, the present invention provides for a vibration dampening device for dampening the vibration of a rotating disc during the machining of the opposing faces thereof by a pair of tools, one tool engaging each surface of the rotor. The dampening device includes a spring member having a wide base portion with two outer ends and an arm section extending from each of the outer ends. At the free end of each of the arms is a pad mounted to pivot about an axis perpendicular to the axis of the arm supporting the pad such that when the arms are positioned on opposite sides of the rotor, the spring will urge the free ends of the arms and the pads mounted thereon towards the faces of the rotor, and the pads will pivot so as to permit the planar surfaces of each pad to engage the adjacent face with the planar surface of the pad parallel to the face of the rotor it engages.

BRIEF DESCRIPTION OF THE DRAWINGS

Further objects and advantages of the present invention will be better understood by reference to the following detailed description taken in connection with the accompanying drawings in which:

FIG. 1 is a side elevational view of a dampening device in accordance with the present invention;

FIG. 2 is a top view of the dampening device shown in FIG. 1;

FIG. 3 is an end elevational view of a dampening device in accordance with FIG. 1;

FIG. 4 is an isometric view of a dampening device in accordance with FIG. 1 attached to the tool mount for a lathe being used to machine a rotor disc which is mounted on a vehicle.

DETAILED DESCRIPTION OF THE DRAWINGS

Figure 5:
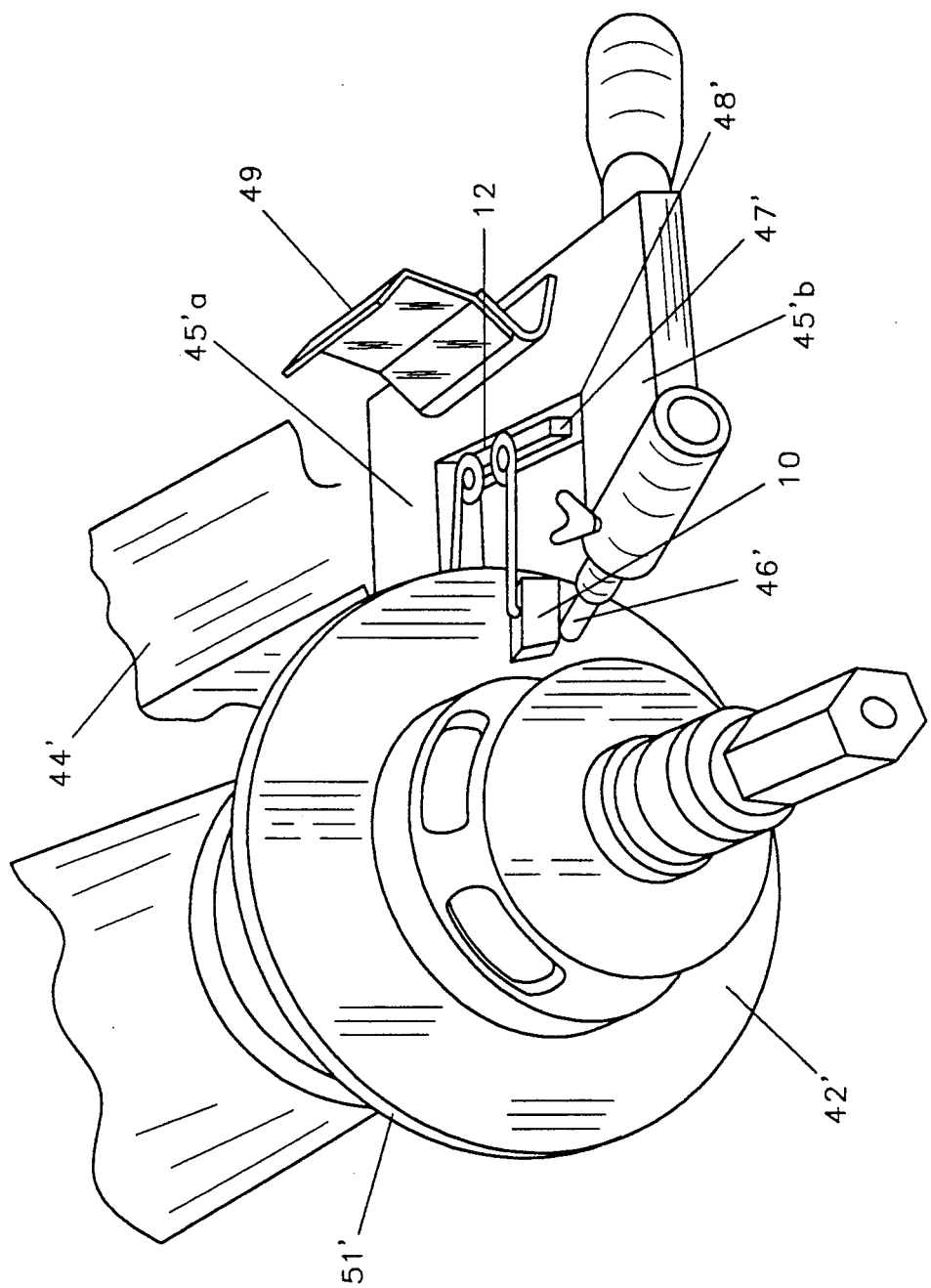
FIG. 5 is an isometric view of a dampening device in accordance with FIG. 1 attached to the tool mount for a lathe being used to machine a rotor with a protective eye shield in place.

Referring to FIGS. 1, 2 and 3, a vibration dampener 10 in accordance with the present invention has a support spring 11 which includes a base portion 12, and at the two ends 13, 15 of the base portion 12 are arm sections 14 and 16 of equal length. Between the base portion 12 and arm section 14, the support spring 11 further has a coil section 18, and similarly between the base portion 12 and the arm section 16, the support spring 11 has a second coil section 20. At the free ends of each arm section 14, 16 and perpendicular to the principal longitudinal axis 14A, 16A of each associated arm sections 14, 16 are outer end sections 22, 24 which are oriented parallel to each other. The coil sections 18, 20 of the support spring 11 are adapted to urge the outer ends 22, 24 of the arm sections 14, 16, respectively, towards each other as shown in FIG. 2.

A pair of pads 26, 28 are made of a rigid, non-asbestos friction material such as a plastic. The pads 26, are substantially rectangular in shape and have planar friction surfaces 31, 32, respectively. The pads 26, 28 have sufficient thickness between the outer surfaces 30, 33, respectively, and the frictional surfaces 31, 32 thereof such that longitudinal holes 35, 36 may be drilled through the pads 26, 28, respectively, parallel to one edge 37, 38 of the rectangular pads 26, 28, respectively. The longitudinal holes 35, 36 in each of the pads 26, 28 have a sufficiently large diameter to receive the outer end sections 22, 24 of the support spring 11, and permit the pads 26, 28 to pivot about the outer end sections 22, 24, respectively. Also, the lower edges 40, 41 of the pads 26, 28, respectively, are sufficiently long such that some portion of the lower edges 40, 41 of each pad 26, 28 will rest upon the cutting tool 46 during the machining operation to retain the dampening device on the rotor.

The outer end sections 22, 24 of the support spring 11 are sufficiently long to pass through the entire length of the longitudinal holes 35, 36 in the pads 26, 28 with the distal ends 22A, 24A of each of the outer end sections 22, 24, respectively, projecting through the far side of the longitudinal holes 35, 36. The distal ends 22A, 24A are thereafter flattened, or otherwise adapted to retain the pads 26, 28 on the outer end sections 22, 24 of the support spring 11. As can be seen in FIGS. 2 and 3, the configuration of the base 12, the arms 14, 16 and the pads 26, 28 mounted on the outer ends 22, 24 thereof is such that the frictional surfaces 31, 32 of the pads 26, 28 will be urged toward each other and will abut one another unless the outer ends 22, 24 of the spring 12 are forcibly separated.

Referring to FIGS. 4 and 5, a rotor disc 42 may either be machined while on the vehicle as depicted in FIG. 4, or removed from the vehicle and mounted on a lathe for machining. As depicted in FIG. 5, the elements of the lathe of FIG. 5 corresponding to elements of the lathe of FIG. 4 bear indicia numbers identical to those shown in FIG. 4 except they are primed. Whether the machining is done by removing the rotor 42' from the vehicle as in FIG. 5, or while the rotor 42 is attached to the vehicle as in FIG. 4, a support arm 44, 44' is provided having a pair of extensions 45A, 45B, 45A', 45B' each of which holds one cutting tool, the cutting tools being positioned on opposite sides of the rotor 42, 42', one of the tools 46, 46' being shown in each of FIGS. 4 and 5. Between the extension 45A, 45B, 45A', 45B' and mounted on the support arm 44, 44' is a support plate 47, 47' the upper edge of which is perpendicular to the plane of surfaces of the rotor 42, 42'. A vibration dampener 10 in accordance with the present invention may be mounted on such a lathe by positioning the pads 26, 28 with one on each of the tools 46, 46' on opposite sides of the rotor 42, 42' and the base portion 12 of the support spring 11 positioned on the upper surface of the support plate 47, 47' and against the inner surface 48, 48' of the support arm 44, 44'. The friction of the planar frictional surfaces 31, 32 of the pads 26, 28 against the rotor 42, 42' which rotates towards the tools 46, 46', maintain the pads 26, 28 in a position adjacent to the tools 46, 46'. The rotation of the rotor 42, 42' and friction of the planar surfaces 31, 32 will also force the base portion 12 of the spring 11 against the inner surface 48, 48' of the support arm 44, 44' and the upper surface of the plate 47, 47' to retain the dampener 10 in the desired position during the surfacing of the rotor 42, 42'.

The arms 14, 16 should be constructed as short as possible, however, they must be sufficiently long to permit the pads 26, 28 to be compressed against the surfaces of the rotor 42, 42' without the cylindrical outer surface of the rotor 42, 42' interfering with the base portion 12 or the coil sections 18, 20 of the support spring 11. The arms 14, 16 must also be long enough such that when the dampener 10 is positioned on a brake lathe, the base portion 12 of the vibration dampener 10 will rest against some portion of the support arm 44, 44' of the lathe, such as the support pates 47, 47'. As a result the vibration dampener 10 will be retained in a fixed position during the machining operation by the contact of the pads 26, 28 against the faces of the rotor 42, 42', the pad 26, 28 resting on the tools 46, 46' and by the contact of the base portion 12 of the support spring 11 against portions of the support arm 44, 44' of the lathe. As shown in FIG. 5, lathes for machining a rotor 42' which has been removed from a vehicle are provided with a protective transparent eye shield 49 which is attached to the support arm 44'. A vibration dampener 10 made according to the present invention can be fitted upon such brake lathes having an eye shield 49, and therefore can be sold as original equipment with such lathes. Prior dampeners could not be used with such lathes unless the eye shield was first removed, and such prior devices could not be sold as original equipment under applicable Federal law.

The length of the base portion 12 is sufficient to space the arm section 14, 16 far enough apart to enable the outer end sections 22, 24 of the support spring 11 to be positioned with the pads 26, 28 on each side of a disc brake 42 during the machining operation. As a consequence, the vibration dampener 10 requires a minimum of space and is usable on a wider variety of existing lathes, as discussed above.

During a machining operation, the pads 26, 28 will pivot such that the planar frictional surfaces 31, 32 of the pads 26, 28, respectively, will at all times be parallel to the faces of the rotor 42, 42' which are being machined and the frictional surfaces 31, 32 will wear substantially evenly so as to maximize their useful life After completion of the machining, the vibration dampener 10 can be easily removed from around the rotor 42, 42' prior to withdrawing the tools 46, 46' from the faces of the rotor 42, 42'.

There is therefore provided in accordance with the present invention, a vibration dampening device 10 which is more readily adaptable to existing lathes for the machining of rotors for disc type brakes. Furthermore, the pads 26, 28 in accordance with the present invention pivot about the outer end sections 22, 24 of the support spring 11 such that the frictional surfaces 31, 32 of the pads 26, 28 are at all times parallel to the faces of the rotor 42.

While the present invention has been described in connection with one embodiment, it will be apparent to those skilled in the art that many changes and modifications may be made without departing from the true spirit and scope of the present invention. Therefore, it is intended by the appended claims to cover all such changes and modifications which come within the true spirit an scope of the invention.

What is claimed is:

1. A vibration dampener for dampening vibration of a rotating disc during machining of the faces thereof by a pair of tooling pieces mounted on a support arm, one of said tooling pieces engaging each of said faces, said vibration dampener comprising in combination:

a spring member having a base section having two ends and having an arm extending from each of said ends of said base section, said arms each having a principal longitudinal axis and an outer end section and said spring being adapted to urge said outer end sections of said arms towards each other, a pair of pads, each of said pads having a planar surface and one of said pads being mounted on said outer end sections of each of said arms, and pivot means for pivotally mounting said pads on said outer end sections of said arm for rotation about an axis perpendicular to said principal longitudinal axis of said arms and substantially parallel to the face of the rotating disc.

2. A vibration dampener in accordance with claim 1 wherein said spring further comprises a coil spring portion at each of the ends of said base section.

3. A vibration dampener for dampening vibration of a rotating disc during machining of the faces thereof by a pair of tooling pieces mounted on a support arm, one of said tooling pieces engaging each of said faces, said vibration dampener comprising in combination:

a spring member having a base section having two ends and having an arm section extending from each of said ends of said base section, each of said arms having an outer end, said spring having a pair of coil sections, one of said coil sections located at each of said ends of said base and said coil spring being adapted to urge the outer ends of said arms towards each other, a pair of pads, each of said pads having a planar surface and one of said pads being mounted on said outer end sections of each of said arms for providing surface contact with a rotating disc, and said base is mountable between said support arm and an outer edge of a rotating disc.

4. The combination comprising:

a brake lathe having a support arm for positioning a tooling piece against the face of a rotating disc, said support arm further having an extension for holding said tooling piece and a portion of said support arm being positioned adjacent said outer edge of said rotating disc, an eye shield on said support arm, and a vibration dampener comprising:

a spring member having a base section having two ends and having an arm extending from each of said ends of said base section, said arms each having an outer end section and said spring being adapted to urge said outer end sections of said arms towards each other, a pair of pads, each of said pads having a planar surface and one of said pads being mounted on said outer end sections of each of said arms, said base positioned on said support arm between said eye shield and an outer edge of a disc, and said surfaces of said pads positioned against faces of a disc.

5. The combination comprising:

a brake lathe having a support arm having an inner surface, said arm for positioning two tooling pieces, one piece to be positioned against each face of a rotating disc having an outer surface, said support arm having two extensions for supporting said tooling pieces and a portion of said support arm extending between said extensions, a vibration dampener comprising:

a spring member having a base section having two ends and having an arm extending from each of said ends of said base section, said arms each having an outer end section and said spring being adapted to urge said outer end sections of said arms towards each other, a pair of pads, each of said pads having a planar surface and one of said pads being mounted on said outer end sections of each of said arms, said base positioned on said support arm between said inner surface and an outer surface of a disc and said surfaces of said pads positioned against faces of a disc.

* * * * *